(No Model.) 4 Sheets—Sheet 1.
G. W. CARY.
MACHINE FOR MAKING SPOOL HEADS.
No. 577,355. Patented Feb. 16, 1897.
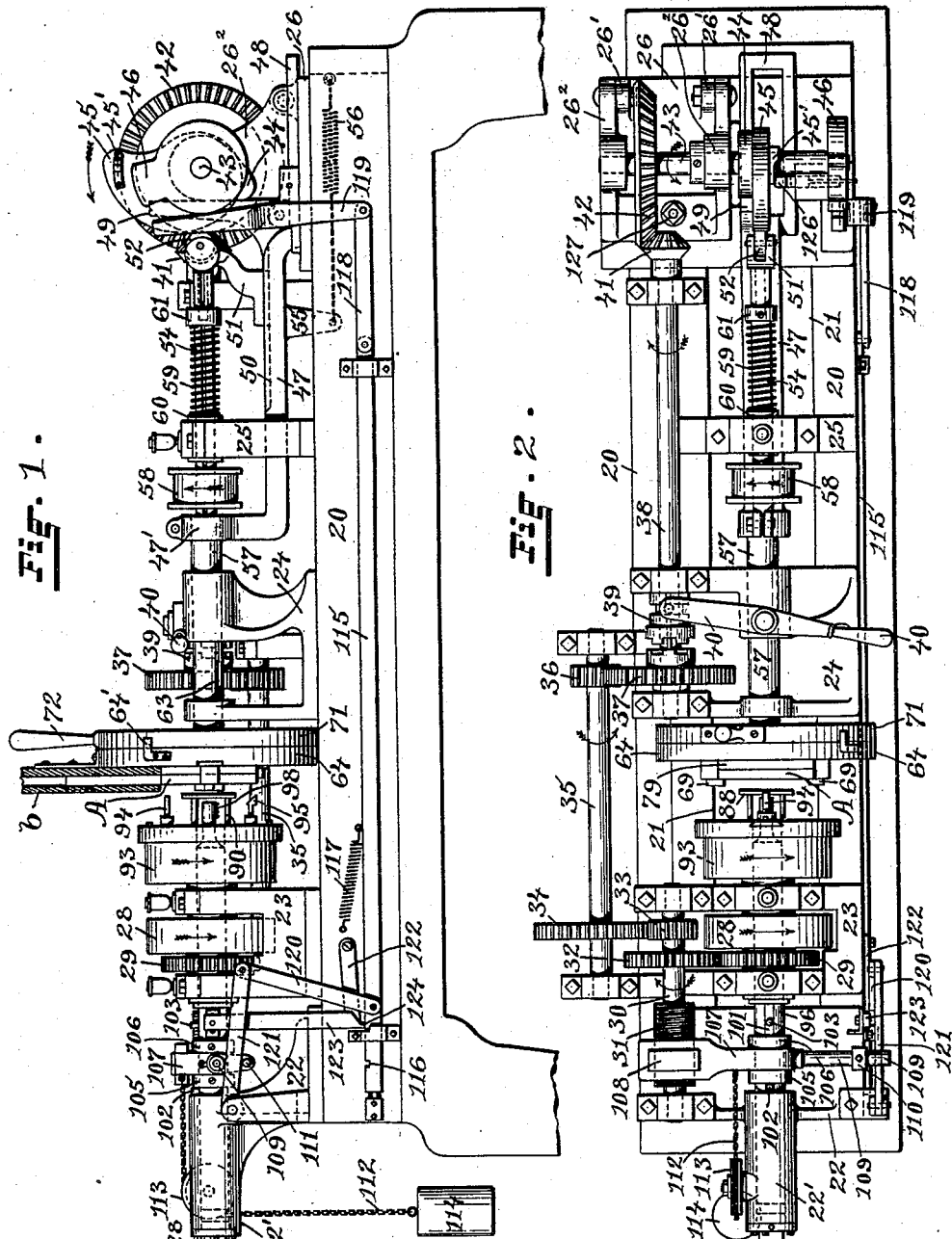
WITNESSES:
M. F. Bligh.
Chas. H. Luther Jr.
INVENTOR:
George W. Cary,
by Joseph A. Miller & Co.,
Attys.

(No Model.)
4 Sheets—Sheet 2.
G. W. CARY.
MACHINE FOR MAKING SPOOL HEADS.
No. 577,355.
Patented Feb. 16, 1897.
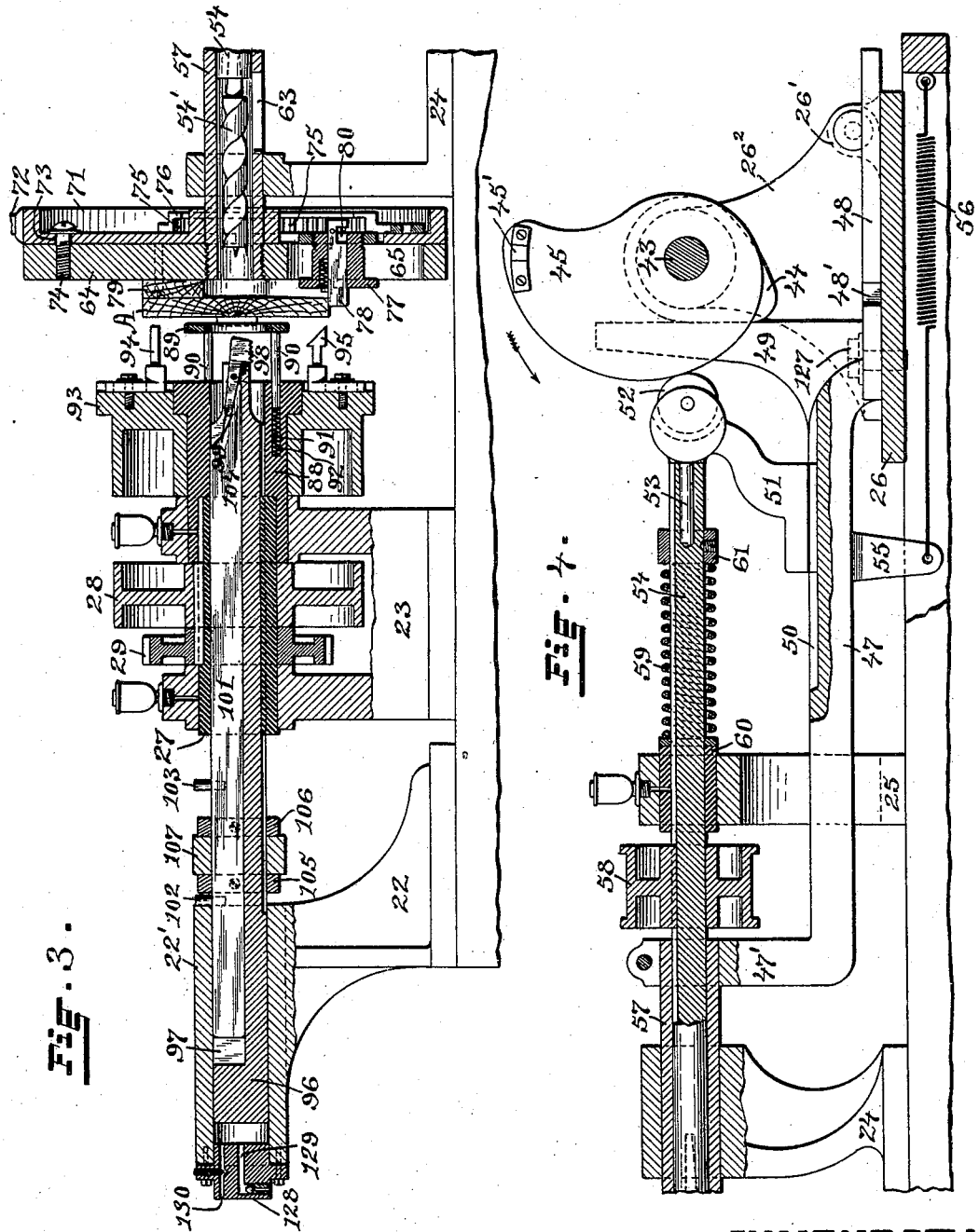
WITNESSES:
M. F. Bligh.
Chas. H. Luther Jr.
INVENTOR:
George W. Cary,
Joseph A. Miller & Co.,
Attys.

(No Model.) 4 Sheets—Sheet 3.

G. W. CARY.
MACHINE FOR MAKING SPOOL HEADS.

No. 577,355. Patented Feb. 16, 1897.

WITNESSES:
M. F. Bligh.
Chas. H. Luther Jr.

INVENTOR:
George W. Cary,
by Joseph A. Miller & Co.,
Attys.

(No Model.) 4 Sheets—Sheet 4.

G. W. CARY.
MACHINE FOR MAKING SPOOL HEADS.

No. 577,355. Patented Feb. 16, 1897.

WITNESSES:
M. F. Bligh.
Chas. H. Luther Jr.

INVENTOR:
George W. Cary,
by Joseph A. Miller & Co.,
Attys.

UNITED STATES PATENT OFFICE.

GEORGE W. CARY, OF NEW BEDFORD, MASSACHUSETTS, ASSIGNOR OF ONE-HALF TO WILLIAM HENRY WILSON, OF SAME PLACE.

MACHINE FOR MAKING SPOOL-HEADS.

SPECIFICATION forming part of Letters Patent No. 577,355, dated February 16, 1897.

Application filed June 11, 1896. Serial No 595,079. (No model.)

*To all whom it may concern:*

Be it known that I, GEORGE W. CARY, of New Bedford, in the county of Bristol and State of Massachusetts, have invented certain new and useful Improvements in Machines for Making Spool-Heads; and I hereby declare that the following is a full, clear, and exact description of the same, reference being had to the accompanying drawings, forming part of this specification.

This invention has reference to improvements in machines for making spool-heads from flat blanks.

The object of the invention is to simplify the operation of the machine, to bring the mechanism for successively acting on the blanks into operation with due regard and relation to the preceding and succeeding steps, and to place the various mechanisms under the control of the operator.

The invention consists in the chuck for holding the blank while under operation.

The invention also consists in the means for transmitting motion from the drive-pulley to the clutch-connected drilling mechanism, together with such mechanism.

The invention also resides in the tapping device for cutting a screw-thread in the perforation of the spool-head.

The invention still further consists in the device for shaping and finishing the spool-head, together with the relation of this device to the tapping mechanism.

The invention also consists in the connections between the drilling mechanism and the tapping mechanism whereby the latter is automatically brought into action.

The invention likewise consists in such other novel features of construction and combination of parts as may hereinafter be more fully described, and pointed out in the claims.

Figure 5:
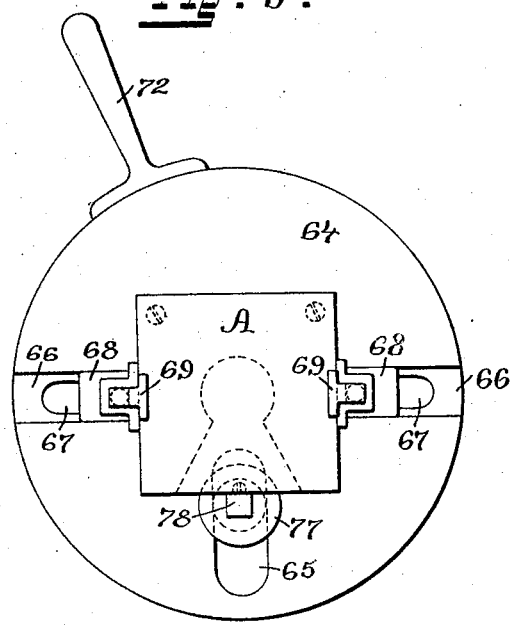
Figure 6:
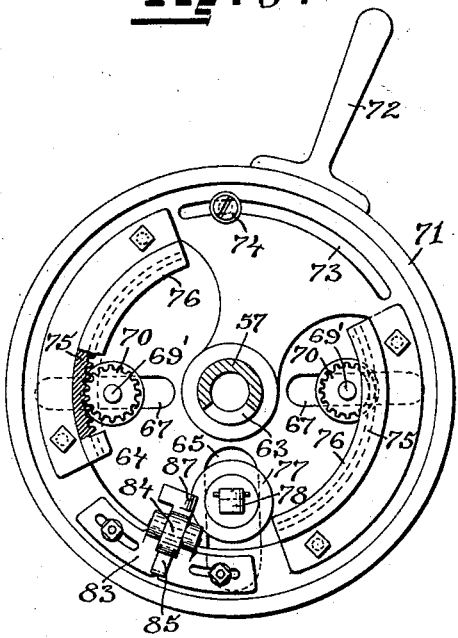
Figure 7:
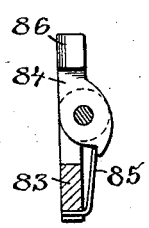
Figure 8:
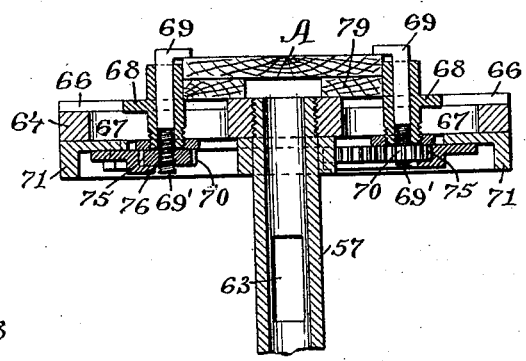
Figure 9:
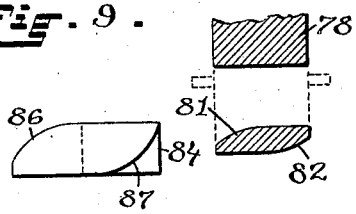
Figure 10:
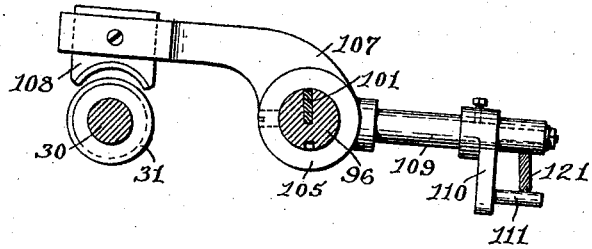
Figure 11:
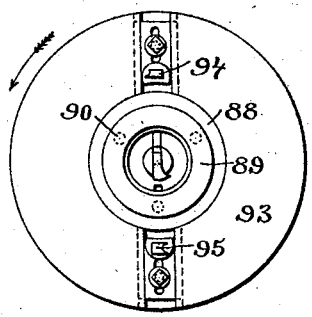
Figure 12:
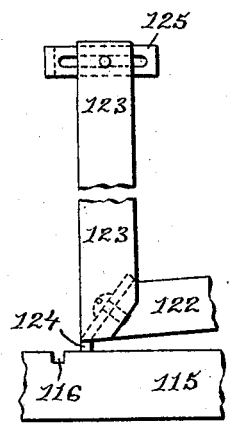
Figure 13:
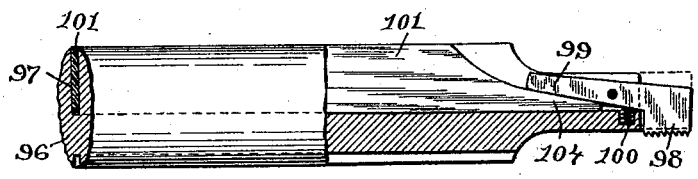
Figure 14:
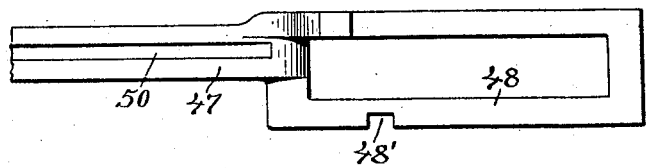
Figure 15:
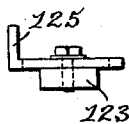
Figure 16:
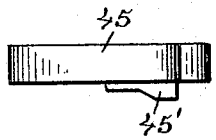
Figure 17:
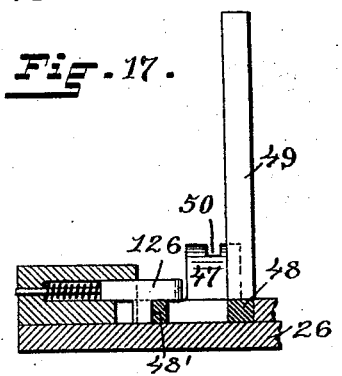

Figure 1 represents a front elevation of the improved machine. Fig. 2 represents a plan view thereof. Fig. 3 represents a vertical sectional view of the machine from the tapping end to and including a portion of the drilling mechanism. Fig. 4 represents a similar view from the latter point to include the drilling-actuating mechanism. Figs. 5 and 6 represent, respectively, obverse and reverse views of the chuck for grasping the blank, holding the same while under operation, releasing the finished head, and intercepting the next blank as it falls into place. Fig. 7 represents a detail of the cam for operating the blank-intercepting finger. Fig. 8 represents a cross-sectional view of the chuck. Fig. 9 represents enlarged details of the rear end of the blank-intercepting finger and a plan view of the cam for operating the same. Fig. 10 is a cross-sectional view of the tapper-bar and the tapper-advancing gear with the connection between the same. Fig. 11 represents a face view of the cutter-head, showing the respective positions of the cutter and finisher tools with the tapper-tool axially disposed. Fig. 12 represents details of the tripping mechanism for relieving the thread-bar when struck by a portion of the connecting-arm. Fig. 13 represents an enlarged view of portions of the tapper-shaft, partially broken away to show its internal construction. Fig. 14 represents a plan view of portions of the bracket in which the rear support for the drill-shaft is movable. Fig. 15 represents an upper end view of the trip shown in Fig. 12 with its guide. Fig. 16 represents an edge view of the drill-cam. Fig. 17 represents a cross-section of portions of the block 26 and the frame movable thereon, showing means for locking the frame.

Similar numerals and letters of reference designate corresponding parts throughout.

This machine is designed for the manufacture of heads for spools, consisting of two large heads, in axial perforations of which the bobbin or quill is secured, these spools being used for carrying yarn or roving in the intermediate stages of its manufacture, or on which yarn or twine in large quantities may be wound.

In the drawings, 20 represents an elongated base of substantial structure supported on the usual standards and having a central longitudinal opening 21 extending for the greater portion of the length of the base. Through this opening the chips cut from the blanks and the finished blanks may fall.

Mounted on the base are the bearing-blocks 22, 23, 24, 25, and 26, in which or on which the main movable mechanism is mounted. In bearings of the block 23 is journaled the sleeve 27, on which is secured the drive-pulley 28 and the transmitting-gear 29. To this sleeve is also secured the cutter-head, and within the sleeve is partially contained the tapper-shaft, as shall hereinafter be more fully described.

In bearings of the blocks 22 and 23, at one side of the sleeve 27, is rotatably mounted the worm-shaft 30, carrying the worm 31 and the gears 32 and 33, the gear 32 intermeshing with the transmitting-gear 29, while the gear 33 engages with and drives the gear 34 on the shaft 35, this shaft being journaled in brackets extending from the base 20 and having the gear 36, which engages with the clutch-gear 37, loosely mounted on the shaft 38, but prevented from reciprocation thereon by one of the bearings of the block 24, in which this shaft is journaled. On this shaft is keyed, against independent reciprocation, the clutch member 39, which is adapted, when brought into contact with the clutch portion of the gear 37, to engage the same to connect the gear 37 with the shaft 38, the movement of the clutch member being effected by means of the lever 40, pivoted to the block 24. On the end of the shaft 38 is the bevel-gear 41, which engages with and drives the large bevel-gear 42 on the cam-shaft 43, this latter shaft being journaled in bearings in the block 26 and extending at right angles to the general extension of the shafts heretofore described. On this shaft are secured the cams 44, 45, and 46.

The bracket-support 47 has a frame 48, furnished with the notch 48', which is free to reciprocate on a plane surface of the block 26, and a vertical member 49. In its upper surface the bracket-support has a groove 50, in which a rib on the bracket 51 is free to slide. The upper end of this bracket 51 has a roller-disk 52 journaled on a shaft and bearing against the face of the cam 45, while a pin 53 extends into a socket in this end of the drill-shaft 54 to support the same without preventing its rotation. From the lower portion of the bracket 51 extends the arm 55, on which a rearward tension is exerted by the coiled spring 56, connected to the arm and to the base.

To the vertical portion 47' of the bracket-support 47 is rigidly secured the sleeve 57, which is reciprocal in bearings of the block 24, and in the sleeve is journaled the drill-shaft 54, carrying any usual form of drill 54' and being reciprocal independent of the sleeve. On the drill-shaft is keyed the drive-pulley 58, a coiled spring 59, mounted on the shaft and bearing against a portion of the sleeve 60 and collar 61, tending to maintain the drill-shaft in a retracted position, the sleeve 60, being of course journaled in a bearing of the block 25, while being held from reciprocation, and the shaft 54 being free to reciprocate therein.

On the forward end of the sleeve 57, which at this portion has the clip-opening, as 63, is secured the chuck-plate 64, having the lower opening 65 and the lateral grooves or guides 66 66, connected with the opposite side of the plate by the slots 67 67. In the grooves are movable blocks 68 68, carrying clamping-fingers 69 69, the screw-threaded shanks 69' 69' of which are free to reciprocate in perforations in said blocks. These clamping-fingers are shaped to overlap the edges of the blank A as it moves down to the position between them and to draw the same toward the chuck-plates when the clamping-fingers are drawn in the same direction. On the screw-threaded shanks 69' 69' of the clamping-fingers are the gears 70 70, which have screw-threaded axial perforations.

The shifting plate 71 has a handle 72 and is journaled on the sleeve 57. It has a curved slot 73, through which the guide-pins 74, secured in the plate 64, extend. Below and at the sides of its axial collar it is open and near its rim is supplied with the curved racks 75 75, which engage with the gears 70 70, the lips 76 76 of the racks preventing the outward movement of the gears. It will thus be seen that by a partial rotation of the plate 71 the gears 70 will be caused to rotate by the racks 75 75, which, through the medium of the screw-threaded shanks of the clamping-fingers 69 69, will reciprocate the same to release or engage a blank, as the case may be.

Secured through the opening 65 in the plate 64 is the sleeve 77, in which the spring-operated finger 78 is reciprocal. The forward end of the finger 78 extends sufficiently beyond the face of the plate 64 or of any obstructions thereon, such as the wood facing 79, to intercept a blank A in its downward movement. At the rear end the finger 78 has a transverse slot 80, the rear wall of which is furnished with the cam-surfaces 81 and 82.

At the lower portion of the plate 71 is adjustably secured the pawl-plate 83, in which the pawl 84 is pivoted to swing on a substantially horizontal axis away from the face of the plate 83 against the action of the spring 85. At the upper end this pawl is fastened into the cam-surfaces 86 and 87.

When the handle 72 is thrown to the left, (as one looks at Fig. 6,) the pawls will act on the intercepting-finger 78 through the engagement of the cam-face 87 of the pawl with the cam-face 81 of the finger, causing the finger to move backward, while the upper end of the pawl passes laterally through the slot 80. The moving backward of the finger at the same time that the blank A is released by the clamping-fingers 69 69 permits the finished blanks to drop out of the machine, while as the finger 78 is immediately brought back to place by its spring it is in position to intercept the next blank. When the plate 71 is shifted backward to cause the clamping of the blank, as heretofore described, the cam-face 86 of the pawl 84 is engaged by the face 82 of the finger, thus throwing outward the upper end of the pawl 84 against the action of the spring 85, this portion of the pawl moving over the cam-face 82 as the pawl is returned to position. Returning to the sleeve 27, it will be seen that at the forward portion thereof is keyed the tubular member 88, provided with the spring-operated presser-plate 89, the arms 90 90 of which enter sockets 91 91 in this member and bear against springs 92 92 in these sockets. On the member 88 is mounted the cutter-head 93, carrying any convenient number of cutters 94 and 95, adjustably mounted in the head, to finish the surface of the blank and to cut away the material beyond its proposed periphery.

Keyed within the sleeve 27 is the tapper-shaft 96, which is free to reciprocate within this sleeve and rotates in unison therewith, the rear portion of the shaft being free to reciprocate and rotate in a bearing 22' of the block 22. This tapper-shaft has the longitudinal slot 97, at the forward portion of which is pivoted the cutter 98, having the shank 99, the spring 100, seated in a socket in the tapper-shaft, acting to throw the cutter inward toward the axial line of the shaft. In the groove or slot 97 is the reciprocal rod 101, having the pins 102 and 103 and the tapering end 104 fitting under the shank 99, so that when the rod 101 is advanced in a greater degree than the tapper-shaft or while such shaft is stationary the shank of the cutter is thrown in a direction to force the cutter 98 outward against the action of the spring, while when the bar 101 is retracted the spring 100 tends to throw the cutter inward.

On the tapper-shaft 96 are secured the collars 105 and 106, and between these the lever 107 is pivoted. At one end of this lever is the half-nut 108, which, when the lever is depressed, engages with the worm 31 to drive the tapper-shaft forward. The opposite end portion of the lever is formed by the arm 109, on which the bracket 110, carrying the pin 111, is adjustably secured. To the lever 107 is fastened one end of the chain 112, which passes over the chain-pulley 113, rotatable on a stud-shaft extending from the bearing 22', and is furnished with the weight 114 for drawing the tapper-shaft backward when the nut 108 is released from the worm 31.

As a means for automatically throwing the nut 108 into and out of gear with the worm 31 I mount the slide-rod 115 in bearings on a vertical face of the machine. This rod 115 has the notch 116 and is connected with the spring 117, which tends to continually draw the rod toward the left. At the end nearest the cam-shaft 43 this slide-rod is pivotally connected by the link 118 with the pivoted lever 119, which extends to a position where the cam 46 may engage it to operate the lever and reciprocate the slide-rod against the action of the spring. This causes the inclined member 120, pivoted to the slide-rod and to the free end of the pivoted arm 121, to be brought toward a vertical position, lifting the free end of this arm 121, and with it the arm portion 109 of the lever 107, and depressing the nut 108 into engagement with the worm 31.

Above the rod 115 is pivoted the arm 122 of the tripper 123. At the junction of the arms is the pin 124, which engages with the notch 116 of the slide-rod when this notch is brought into position and holds the rod against the spring action when the cam 46 has ceased to act. At the upper end of the tripper 123 is adjustably secured the block 125, which when the tapper-shaft and the lever 107 are sufficiently advanced by the working of the nut 108 in the worm 31 is struck by the bracket 110 on the lever-arm and pushed along, this causing the swinging upward of the arm 122 on its pivot and the lifting of the pin 124 out of the notch 116, thus releasing the slide-rod 115, which is moved back to place by the spring 117. The member 120 again assumes an inclined position, drawing the pivoted arm 121 downward. This in turn bearing on the pin 111 depresses the arm 109 of the lever 107, thus lifting the nut 108 out of engagement with the worm 31. The weight 114 now acts to draw the lever 107 and the tapper-bar backward until the collar 105 strikes the pin 102, which in turn brings up against the bearing 22'.

The operator standing before the machine can conveniently grasp the handles 40 and 72. His first action is to draw the handle 72 toward him until it strikes the stop 64' on the chuck-plate 64. This effects the release of the finished head and the surplus material from which the head has been cut, as has been described. A new blank now passes down the chute $b$ and between the gripping-fingers 69 until its descent is stopped by the finger 78. The handle 72 is now thrown back to its normal position, and the handle 40 is moved away from the chuck, thus throwing the clutch member 39 into engagement with the gear 37 and starting into action the cam-driving mechanism. The first action of the cams is through the cam 45, bearing on the roller-disk 52 to advance the drill-shaft while the same is rotated by the belt working on the pulley 58. At the completion of the drilling the cam 46 to throw the lever 119, and through its connections to engage the nut 108 with the worm 31 as the tapper-shaft advances under this action, is rotated by the belt working on the pulley 28, the cutter 98 entering the perforation in the blank as the drill has been retracted by the spring 59 and cutting a screw-thread therein. At the time when the work of the tapper is completed the pin 103 on the rod 101 strikes a portion of the bearing-block 23. The advance of this rod being prevented while the tapper-shaft is still moving forward withdraws the end 104 from beneath the shank 99 of the cutter. The cutter is thrown inward by its spring, and at the same time the tripper 123 is actuated, as heretofore described, to release the slide-bar 115 and to disengage, by means of the connections, the nut 108 from the worm 31 when the tapper-shaft is drawn backward by the weight 114 until the pin 102 strikes the bearing 22' and shifts the rod 101 to reset the tapper.

While the tapping process has progressed, the cam 45 has been brought into such position that the swell 45' acts on the spring-operated bolt 126 to disengage the same from the notch 48' in the frame 48. The cam 44 now acts on the vertical member 49 of the frame 48 to move the same forward. As the bracket-arm 47 is secured to the sleeve 57 and the chuck carrying the drilled and tapped blank is mounted on the end of this sleeve, the blank is moved forward to be acted upon by the cutting and finishing tools secured in the cutter-head, the spring 59 then being permitted to retract the chuck with its blank until the frame 48 has again been secured in its normal position by the bolt 126. The bearing-block 26 has the studs 26' 26', to which arms of the frame 26² are pivoted. The frame is normally held in position by the bolt 127. By the release of this bolt the bearing-frame 26², with the shaft 43 and its gears and cams, may be swung back, leaving the rear portion of the drilling apparatus unobstructed.

By the use of the plug 128, fitted in the end of the bearing 22' and having the inlet 129 governed by a ball-valve and the outlet 130 governed by a screw, an air-cushion is formed to receive the end of the tapper-shaft 96 when carried backward by the weight 114 and to prevent a too sudden interruption to the backward movement thereof.

Having thus described my invention, I claim as new and desire to secure by Letters Patent—

1. In a spool-head machine, a tapper-shaft having a longitudinal groove and a spring-operated cutter pivoted at the forward portion of the shaft, in combination with a bar reciprocal in said groove and adapted to move the cutter against the action of the spring.

2. In a spool-head machine, the combination with a non-reciprocal tubular cutter-head rotatably mounted, and a reciprocal tapper mechanism partially contained within the cutter-head, of a reciprocal chuck mounted before the cutter-head, and means for reciprocating the same.

3. In a spool-head machine, the combination with a drive-pulley, a sleeve journaled in bearings on which the pulley is mounted, a gear also on said sleeve, and a tapper-shaft extending through said sleeve and keyed thereto, of a worm-shaft journaled in bearings parallel to said sleeve and carrying a worm, a gear on the worm-shaft intermeshing with the gear on the sleeve, a lever pivoted on the tapper-shaft, a nut on said lever adapted to engage the worm when depressed, a drilling mechanism, a cam connected with the drill mechanism, and means for depressing the nut set in action by said cam.

4. In a spool-head machine, the combination with a reciprocal chuck for holding the blank, and a drilling device mounted to independently reciprocate and rotate, of a non-reciprocal cutter, and a tapper mounted to rotate with the cutter and adapted to reciprocate.

5. In a spool-head machine, the combination with bearings, a sleeve 57 mounted to reciprocate therein, and a chuck comprising a stationary plate secured to the sleeve, a plate rotatable on the sleeve and holding devices operated by the plate, of a sleeve-operating connection comprising an arm secured to the sleeve and a supporting-frame having a vertical member and means adapted to be engaged by a locking-bolt, the locking-bolt and means, in the nature of cams, for releasing said bolt and operating to move said frame.

6. In a spool-head machine, the combination with a tapper-bar mounted to reciprocate, a driven worm-shaft, a worm thereon, and an arm pivoted on the tapper-shaft, having at one end a nut for engaging the worm and at the other a member adapted to be moved up or down by a swinging arm, of such an arm, an inclined member pivoted to said arms and adapted to raise the arm when brought toward the perpendicular, a slide-rod for actuating the inclined member, and a combined locking device and tripper designed to lock said slide-rod and to be tripped to release the same by the forward movement of the tapper-shaft.

7. In a spool-head machine, the combination with a clutch-plate, laterally-adjustable clamping-fingers mounted therein and having screw-threaded shanks, and gears working on said shanks, of a plate rotatably secured to said chuck-plate and having a handle, and curved racks secured to said second plate with which the gears engage and having flanges overlapping said gears.

8. The combination with the plate 64 having the guides 66 66 and the slots 67 67, the blocks 68 68 mounted in the guides, the clamps 69 69 reciprocal in said blocks and having screw-threaded ends, and the gears 70 screwing on said ends, of the plate 71 having the handle 72 and mounted to rotate, and the curved racks 75 having the flanges 76 secured to said plate 71, said racks engaging the gears as described.

9. The combination with the plate 64 having the opening 65, the sleeve 77 secured through said opening, and the intercepting-finger 78 mounted to reciprocate in the sleeve and having the slot 80 and the cams 81 and 82, of the plate 71 mounted to rotate adjacent to the plate 64, the plate 83 adjustably secured on said plate 71, and the spring-operated pawl 84 pivoted on the plate 83 and having the cams 86 and 87, as described.

10. The combination with the bearing-blocks 22 and 23, the sleeve 27 journaled in the block 23 and carrying a belt-pulley, the tapper-shaft 96 keyed to said sleeve and reciprocal independent thereof, said shaft being furnished with the slot 97, and the spring-operated cutter 98 pivoted in the forward end of said slot and having the shank 99, of the sliding rod or bar 101 mounted in said slot 97 and having the end 104 adapted to raise the cutter-shank when advanced, the pins 102 and 103 secured in said bar 101 between the bearing-blocks and adapted to strike one or the other to shift the bar, and means for reciprocating the tapper-shaft.

In witness whereof I have hereunto set my hand.

GEORGE W. CARY.

Witnesses:
FREDERICK W. LUSCOMB,
MAYHEW R. HITCH.